UNITED STATES PATENT OFFICE.

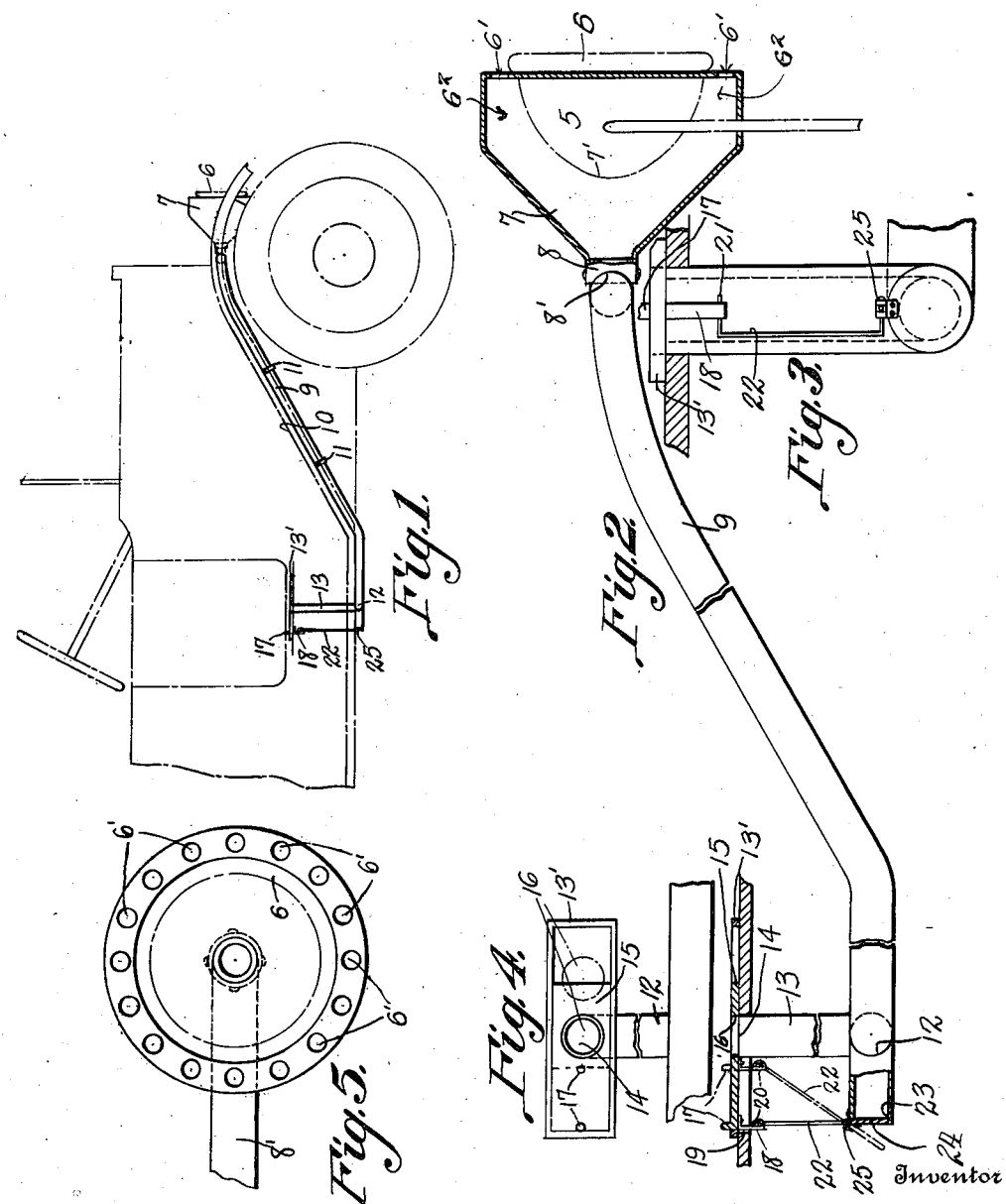

CHARLES H. VICKERY, OF ATTICA, NEW YORK.

VENTILATOR.

1,322,847.  Specification of Letters Patent.  Patented Nov. 25, 1919.

Application filed July 10, 1919. Serial No. 309,962.

*To all whom it may concern:*

Be it known that I, CHARLES H. VICKERY, a citizen of the United States, residing at Attica, in the county of Wyoming and State of New York, have invented a new and useful Ventilator, of which the following is a specification.

This invention relates to new and useful improvements in ventilating means, and more particularly to a system for ventilating the passenger compartments of an automobile at the feet of the persons occupying the compartments.

The primary object of this invention is to provide means for ventilating the front compartment of an automobile, at a point adjacent the feet of the operator, it being a known fact, that due to the heat generated by the engine, the floor of the front compartment becomes exceedingly hot, thereby rendering the front compartment uncomfortable, especially in warm weather.

A further object of the invention is to provide means for controlling the volume of air entering the car, through the ventilating system.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

Referring to the drawing:—

Figure 1 is a side elevational view of a portion of a motor vehicle with my invention applied thereto.

Fig. 2 is a side elevational view of the system, with the air catching means shown in cross section.

Fig. 3 is an elevational view of the pipe which connects the system to the floor of the vehicle, Fig. 4 is a top plan view of the register in which the system discharges and;

Fig. 5 is a front elevational view of a lamp with the air catching funnel attached thereto.

Referring to the drawing in detail, numeral 5 designates the usual automobile lamp provided with the usual lens securing ring 6, but which ring as shown, is relatively wide and provided with a plurality of apertures 6' extending therethrough.

A substantially funnel shaped member or air catch 7 has its forward edge secured to the lens securing ring 6 in any well known manner, said funnel adapted to house the lamp 5, and provide an air space or passage way 6², between the lamp 5 and funnel 7, due to the spaced relation of the walls of the funnel with the curved reflector 7' of the lamp proper.

The reduced end 8 of the funnel shaped member 7 is connected with the horizontal pipe 8', at one end thereof, the opposite end of pipe 8' having connection with the pipe 9, which is curved to conform to the curvature of the fender 10, to the underside of which the same is connected by means of cleats 11.

Pipe 9 has a right angle pipe 12 in communication therewith, which pipe terminates in a vertically disposed pipe 13, the upper, or discharge end thereof having connection with the register casing 13', positioned in the floor of a car, the same being provided with the circular opening 14, controlled by, the horizontal sliding plate 15, which is also provided with a circular opening 16 adapted to be moved into registry with the opening 14 to allow air to be discharged therethrough.

An operating lug 17 is carried by the sliding plate 15 and includes a depending arm 18 operating in the slot 19 provided under the register casing 13' the slot 19 being formed in the floor of the car, one end of said arm 18 terminating in an elongated eye 20, in which operates the right angled end portion 21 of the vertically extending valve rod 22.

The valve rod 22 is pivotally connected to the extension 23 of pipe 9 as at 25, and carries the disk shaped valve member 24 on the lower end thereof, and as shown said valve member 24 will open or close the end of the extension 23, at the will of the operator, by moving the sliding plate 15 within its casing.

It is therefore obvious that if it becomes necessary to cool the interior of the car, it is only necessary to move the register, or sliding plate 15, to the position as indicated by Fig. 2 of the drawing, which movement, simultaneously closes the open end of the extension 23, with the result that cold air passes upwardly through pipe 13, and into the car. When it becomes necessary to cut off the supply of air to the car, movement of the sliding plate 15 in the opposite direction, to a position as indicated by Fig. 4 of the drawing, results in the closing of the opening 14, and the opening of the end of the extension 23. The air now has a direct passage through pipe 9 and out through the extension 23.

From the foregoing it will be seen that if an automobile provided with a ventilating system as shown in the present invention, is moving along at a moderate rate of speed, cool air is caught in the funnel shaped member 7, and directed rearwardly through the pipes of the system which connect the funnel shaped member 7 and register, and from where the same is discharged through the floor of the car and into the passenger compartment.

Having thus described my invention, what I claim is:—

1. In a ventilating system for motor cars, a funnel shaped member positioned adjacent the front of the car, a register positioned in the floor of the car, means for providing communication between the funnel shaped member and register, said means including a rearwardly extending pipe, a shutter slide for controlling the passage of air through said register, a valve coöperating with one end of the rearwardly extending pipe for controlling the passage of air from said pipe, in one direction, means for connecting the slide and valve whereby movement of the slide produces a relative movement of the valve.

2. In a ventilating system for motor cars a funnel shaped member supported adjacent the front of the car, a register supported in the floor of the car, means for providing connection between the funnel shaped member and the register, said means including a relatively long pipe, a slide for controlling the discharge of air through the register, a valve for controlling the discharge of air from one end of the pipe, a link connecting the slide and valve to produce a relative movement of the valve when the slide is moved.

In testimony that I claim the foregoing as my own, I have hereto affixed my signature in the presence of two witnesses.

CHARLES H. VICKERY.

Witnesses:
 HENRY SANGBORH,
 W. M. SLATER.